(12) United States Patent
Donovan et al.

(10) Patent No.: US 6,879,680 B2
(45) Date of Patent: *Apr. 12, 2005

(54) METHOD OF AND SYSTEM FOR EXTENDING INTERNET TELEPHONY OVER VIRTUAL PRIVATE NETWORK DIRECT ACCESS LINES

(75) Inventors: Steven R. Donovan, Plano, TX (US); Matthew J. Cannon, Dallas, TX (US)

(73) Assignee: MC, Inc., Ashburn, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/045,880

(22) Filed: Jan. 11, 2002

(65) Prior Publication Data

US 2002/0057786 A1 May 16, 2002

Related U.S. Application Data

(63) Continuation of application No. 09/364,536, filed on Jul. 29, 1999, now Pat. No. 6,453,034.

(51) Int. Cl.[7] .......................... H04M 7/00; H04L 12/66
(52) U.S. Cl. .................. 379/220.01; 370/356; 370/401; 370/410; 370/466; 370/467; 379/230; 379/231; 379/234; 379/900; 379/901
(58) Field of Search .............................. 370/352, 354, 370/356, 389, 392, 401, 410, 466, 467; 379/90.01, 93.07, 219, 220.01, 221.15, 230, 231, 232, 233, 234, 900, 901

(56) References Cited

U.S. PATENT DOCUMENTS

| | | |
|---|---|---|
| 5,303,286 A | 4/1994 | Wiedeman |
| 5,434,907 A | 7/1995 | Hurst et al. |
| 5,634,012 A | 5/1997 | Logston et al. |

(Continued)

FOREIGN PATENT DOCUMENTS

| | | | |
|---|---|---|---|
| EP | 0794650 | 9/1997 | ............ H04M/3/50 |
| EP | 0123456 | 1/2000 | |
| WO | 97/16007 | 5/1997 | ........... H04L/12/66 |
| WO | WO97/22209 | 6/1997 | |
| WO | 97/22210 | 6/1997 | ............ H04Q/3/00 |
| WO | WO97/22209 | 2/1999 | |

OTHER PUBLICATIONS

H. Schulzrinne, A Comprehensive Multimedia Control Architecture for the Internet, 1997 IEEE, pp. 65–76.
Rosenberg et al. Internet Telephony Gateway Location, 1998 IEEE, pp. 488–496.
Schulzrinne et al. Signaling for Internet Telephony, IEEE, Sep. 1998, pp. 298–307.
Wedlund et al. Mobility Support Using SIP, 1999 Association for Computing Machinery, pp. 76–82.
Handley et al., "SIP: Session Initiation Protocol", Network Working Group, Request for Comments 2543, Mar. 1999, pp. 1–104.
Camarillo et al., "The SDP Fid Attribute", Internet Engineering Task Force, Internet Draft, Apr. 2001, pp. 1–4.
Rosenberg, "SIP: Past, Present and Future", May 10, 2000.
Cable Television Laboratories, Inc., "PacketCable CMS to CMS Signaling Specification", Nov. 28, 2000.

(Continued)

Primary Examiner—Harry S. Hong

(57) ABSTRACT

A virtual private network includes an internet protocol (IP) network and a public switched telephone network (PSTN). An enterprise gateway is operably connected to the IP network. The enterprise gateway is operably connected to a switch of the PSTN through a direct access line (DAL). The set-up signaling for virtual private network calls and the calls themselves are transported across the internet protocol network and the public switched telephone network through the direct access line.

41 Claims, 2 Drawing Sheets

U.S. PATENT DOCUMENTS

| | | | |
|---|---|---|---|
| 5,664,009 A | 9/1997 | Hurst et al. | |
| 5,680,116 A | 10/1997 | Hashimoto et al. | |
| 5,699,359 A | 12/1997 | Suga | |
| 5,732,219 A | 3/1998 | Blumer et al. | |
| 5,742,763 A | 4/1998 | Jones | |
| 5,745,556 A | 4/1998 | Ronen | |
| 5,794,039 A | 8/1998 | Guck | |
| 5,802,510 A | 9/1998 | Jones | |
| 5,826,039 A | 10/1998 | Jones | |
| 5,832,221 A | 11/1998 | Jones | |
| 5,859,898 A | 1/1999 | Checco | |
| 5,864,610 A | 1/1999 | Ronen | |
| 5,867,494 A | 2/1999 | Krishnaswamy et al. | |
| 5,867,495 A | 2/1999 | Elliott et al. | |
| 5,883,894 A | 3/1999 | Patel et al. | |
| 5,889,774 A | 3/1999 | Mirashrafi et al. | |
| 5,907,547 A | 5/1999 | Foladtre et al. | |
| 5,913,176 A * | 6/1999 | Barabash | 455/560 |
| 5,923,659 A | 7/1999 | Curry et al. | |
| 5,930,348 A | 7/1999 | Légnier et al. | |
| 5,951,638 A | 9/1999 | Hoss et al. | |
| 5,953,504 A | 9/1999 | Sokal et al. | |
| 5,956,391 A | 9/1999 | Melen et al. | |
| 5,958,005 A | 9/1999 | Thorne et al. | |
| 5,960,416 A | 9/1999 | Block | |
| 5,999,525 A | 12/1999 | Krishnaswamy et al. | |
| 6,064,653 A | 5/2000 | Farris et al. | |
| 6,069,890 A | 5/2000 | White et al. | |
| 6,073,160 A | 6/2000 | Grantham et al. | |
| 6,078,583 A | 6/2000 | Takahara et al. | |
| 6,081,518 A | 6/2000 | Bowman-Amuah | |
| 6,084,952 A | 7/2000 | Beerman, Jr. et al. | |
| 6,094,525 A | 7/2000 | Perleman et al. | |
| 6,118,864 A | 9/2000 | Chang et al. | |
| 6,134,235 A | 10/2000 | Goldman et al. | 370/352 |
| 6,137,869 A | 10/2000 | Voit et al. | |
| 6,144,667 A | 11/2000 | Doshi et al. | |
| 6,147,975 A | 11/2000 | Bowman-Amuah | |
| 6,151,390 A | 11/2000 | Volftsun et al. | 379/229 |
| 6,151,629 A | 11/2000 | Trewitt | |
| 6,157,648 A | 12/2000 | Voit et al. | |
| 6,161,008 A | 12/2000 | Lee et al. | |
| 6,163,536 A | 12/2000 | Dunn et al. | 370/352 |
| 6,167,042 A | 12/2000 | Garland et al. | |
| 6,178,181 B1 | 1/2001 | Gritho | |
| 6,188,760 B1 | 2/2001 | Oran et al. | |
| 6,195,697 B1 | 2/2001 | Bowman-Amuah | |
| 6,201,858 B1 | 3/2001 | Sundhar | |
| 6,202,081 B1 | 3/2001 | Naudus | |
| 6,215,858 B1 | 4/2001 | Bartholomew et al. | |
| 6,226,289 B1 | 5/2001 | Williams et al. | |
| 6,233,318 B1 | 5/2001 | Picard et al. | |
| 6,240,391 B1 | 5/2001 | Ball et al. | |
| 6,253,249 B1 | 6/2001 | Belzile | |
| 6,282,270 B1 | 8/2001 | Porter | |
| 6,292,479 B1 | 9/2001 | Bartholomew et al. | |
| 6,301,609 B1 | 10/2001 | Aravamudan et al. | |
| 6,333,931 B1 | 12/2001 | LaPier et al. | 370/385 |
| 6,335,927 B1 | 1/2002 | Elliott et al. | |
| 6,335,968 B1 | 1/2002 | Malik | |
| 6,339,594 B1 | 1/2002 | Civanlar et al. | 370/352 |
| 6,381,316 B2 | 4/2002 | Joyce et al. | 379/114.2 |
| 6,411,705 B2 | 6/2002 | Oran et al. | 379/230 |
| 6,453,034 B1 * | 9/2002 | Donovan et al. | 370/356 |
| 6,463,053 B1 | 10/2002 | Chen | 370/352 |
| 6,507,647 B1 | 1/2003 | Mandalia | 379/219 |
| 6,515,997 B1 | 2/2003 | Feltner et al. | 370/401 |
| 6,519,242 B1 | 2/2003 | Emery et al. | 370/338 |
| 6,529,499 B1 | 3/2003 | Doshi et al. | 370/352 |
| 6,567,399 B1 | 5/2003 | Schuster et al. | 370/352 |
| 6,570,869 B1 * | 5/2003 | Shankar et al. | 370/352 |
| 6,633,571 B1 * | 10/2003 | Sakamoto et al. | 370/401 |

OTHER PUBLICATIONS

Marshall et al., "SIP Proxy–to–Proxy Extensions for Supporting DCS" SIP Working Group Internet Draft, Nov. 2000, pp. 1–24.

Woods, D., "Translating Menus at the VOIP Café", Dec. 27, 1999, pp. 1–4.

Cisco Systems, Inc., "Architecture for Voice", Video and Integrated Data, 2000, pp. 1–23.

Schulzrinne, H., "The Session Initiation Protocol (SIP)", Sep. 28, 2000.

Schulzrinne, H., Internet Telephony and Multimedia, Status and Directions, Aug. 7, 2000.

Schulzrinne et al., "The Session Initiation Protocol: Internet–Centric Signalling", IEEE Communications Magazine, Oct. 2000, pp 134–141.

Dalgic et al., "True Number Portability and Advanced Call Screening in a SIP–Based IP Telephony System", IEEE Communications Magazine, Jul. 1999, pp. 96–101.

Zimmerer, Eric, "SIP+ (Inter MGC Protocol); Edition 0.0", Level 3 Communications, Dec. 4, 1998, paragraph 0002, 02.1, 02.4 and Figure 4, cs.columbia.edu/sip/drafts/SIP+ 01.doc.

Donovan, S., "The SIP Info Method", Internet Engineering Task Force, Feb. 8, 1999, the whole document.

Sijben, P. et al., "Toward the PSTN/Internet Inter–Networking; Media Device Control Protocol", Internet Engineering Task Force, Version .03, Feb. 9, 1999, paragraph 10.1 and 11.4.

Schulzrinne et al., "RTP Payload for DTMF Digits, Telephony Tones and Telephony Signals", Internet Engineering Task Force, Jun. 9, 1999, paragraph 0001, openphone.org/docs/dtmf/tones.pdf.

Schulzrinne, H. et al., "Signaling for Internet Telephony", IEEE, Oct. 13, 1998, pp. 298–307.

Rosenberg et al., "Programming Internet Telephony Services ", IEEE Network, IEEE Inc., New York, US, vol. 13, No. 1, May 1999, pp. 42–49.

Lennox et al., "Transporting User Control Information in SIP Register Payloads", Internet Engineering Task Force, Feb. 23, 1999, pp. 1–9.

* cited by examiner

METHOD OF AND SYSTEM FOR EXTENDING INTERNET TELEPHONY OVER VIRTUAL PRIVATE NETWORK DIRECT ACCESS LINES

CROSS REFERENCE TO RELATED PATENTS

This application is a Continuation of Ser. No. 09/364,536, U.S. Pat. No. 6,453,034 B1, filed Jul. 29, 1999, entitled "METHOD OF AND SYSTEM FOR EXTENDING INTERNET TELEPHONY OVER VIRTUAL PRIVATE NETWORK DIRECT ACCESS LINES."

BACKGROUND

The present invention relates generally to the field of virtual private networks, and more particularly to a method of and system for providing a virtual private network in which a portion of each call is transported through an internet protocol network.

DESCRIPTION OF THE PRIOR ART

Some larger organizations with far-flung sites and locations use virtual private networks (VPNs) as an alternative to traditional long distance services for their intra-organizational telephone communications. Virtual private networks are created within the public switched telephone system but they provide a communication system that appears from the users prospective to be private.

Referring to FIG. 1, there is shown a simplified block diagram of a virtual private network. An intra-location telephone system includes a plurality of telephones 11 operably connected to a private branch exchange (PBX) 13. As is well known to those skilled in the art, several or even hundreds of telephones may be operably connected to PBX 13.

PBX 13 provides intra-site communication between telephone and other telephones at the site. Additionally, a user of a telephone 11 may make a local or long distance call outside of the location by entering a digit, such as "9", to obtain an outside line. Additionally, a user of telephone 11 may make a VPN call by entering another digit, such as "8", to reach a member of the organization at another location. The other location may be in a separate city, state, or even country. Typically, VPN numbers have the appearance of local seven digit telephone numbers. A three digit prefix number identifies a location and the remaining four digits identify a telephone within the location.

In the example of FIG. 1, a user of telephone 11 at a location located in, for example, California, wishes to place a VPN call to a telephone 15 located at a site of the organization in, for example, New York. The telephones 15 of the site in New York are operably connected to a PBX 17 that services the site. For purposes of illustration, the VPN number associated with telephone 15 is 555-1234. To initiate the call, a user takes telephone 11 off hook and receives a dial tone from PBX 13. The user enters "8" to identify the call as a VPN call and receives another dial tone. Then, the user enters the digits 555-1234. PBX 13 forwards the call to a switch 19 of a public switched telephone network (PSTN) 21 over a direct access line (DAL 23). Switch 19 is identified in PSTN 21 by a unique originating switch identifier (OSID). DAL 23 is identified by an originating trunk group (OTG) identifier. When switch 19 receives the dialed digits on the DAL 23, it must consult a service control point (SCP) 25 for routing instructions. SCP 25 uses the OSID and the OTG to determine the identity of the VPN customer and provides routing instructions to switch 19 based on the customer identification and the dialed digits. Switch 19 routes the call through PSTN 21 to an appropriate terminating switch 27. Switch 27 is operably connected to PBX 17 to complete the call to telephone 15.

One of the problems with VPN service is that the public switched telephone network does not extend reliably to all parts of the world. Because of the unreliability of the PSTN in certain parts of the world, certain locations of organizations particularly, those located in developing nations, are unable to use VPN services.

Recently, organizations have begun to build and use packet switched data networks, such as private intranets and the Internet itself, for mission critical communications. Even in regions without reliable access to the public switched telephone system, organizations have built or have gained access to robust high speed data networks for the transfer of data and electronic communications, such as e-mail, between locations.

It is an object of the present invention to provide a system that extends VPN services through data networks, such as private intranets and the Internet.

SUMMARY

The present invention provides a virtual private network (VPN) that includes an internet protocol (IP) network and a public switched telephone network (PSTN). An egress enterprise gateway is operably connected to the IP network. The egress enterprise gateway is operably connected to a switch of the PSTN through a direct access line (DAL). The set-up signaling for virtual private network calls and the calls themselves are transported across the IP network and the PSTN through the DAL. An intelligent layer in the IP network has the ability to route IP network originated calls to a traditional PSTN DAL.

DETAILED DESCRIPTION

Figure 1:
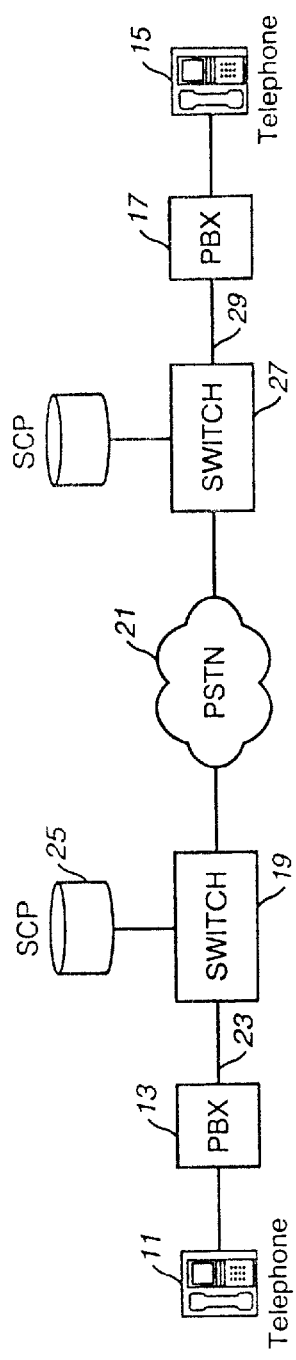
FIG. 1 is a block diagram illustrating a virtual private network of the prior art.
Figure 2:
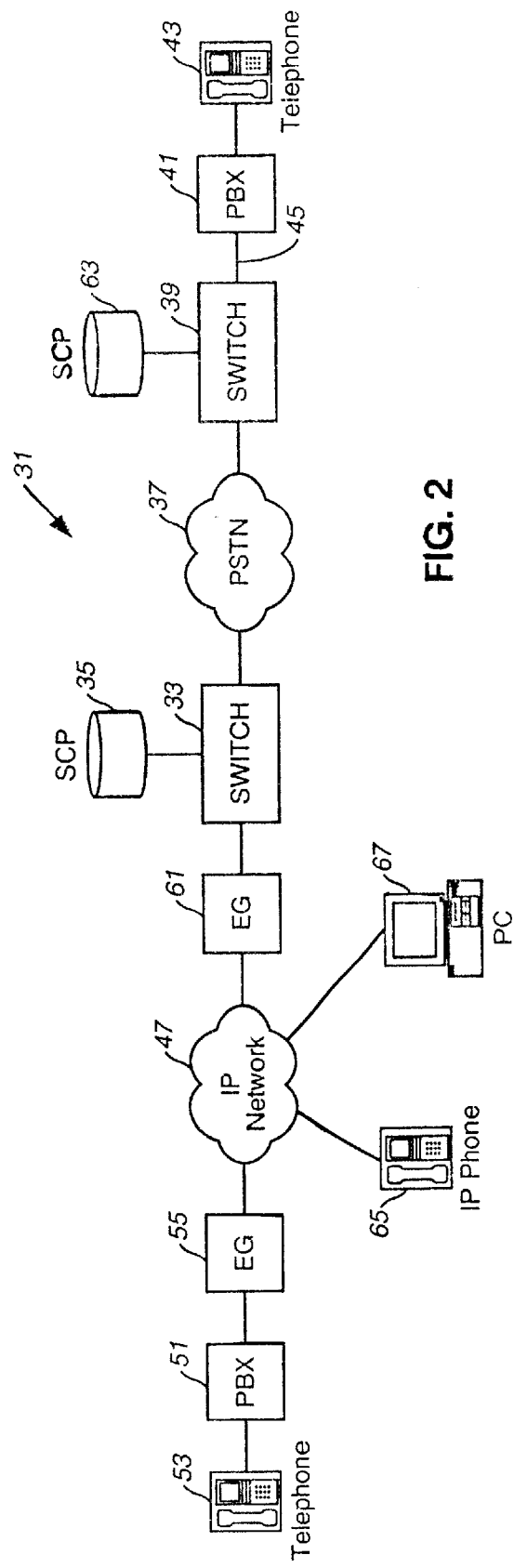
FIG. 2 is a block diagram illustrating a virtual private network according to the present invention.

Referring now to FIG. 2, a VPN according to the present invention is designated generally by the numeral 31. A portion of VPN 31 is implemented in a traditional PSTN environment. The PSTN part of network 31 includes a switch 33 that is served by a SCP 35. Switch 33 is operably connected to a PSTN 37, which in turn is operably connected to a switch 39. Switch 39 is operably connected to a PBX 41 at a location of an organization through a DAL 45. PBX 41 is operably connected to a plurality of telephones, even though only one is shown as telephone 43.

According to the present invention, a portion of VPN 31 is also implemented in an IP network environment. The IP network environment of VPN 31 includes an IP network, which is generally designated by the numeral 47. IP network 47 may comprise a private intranet, the Internet, or a combination of a private intranet and the Internet. IP network 47 provides traditional Internet and web-based services, as well as IP telephony services.

A local organization's telephone system includes a PBX 51 and a plurality of telephones, even though only one is shown as telephone 53. Telephone 53 operates in the normal way. A user can use telephone 53 to call other telephone extensions within PBX 51. PBX 51 can also provide a telephone 53 with an outside line on which the user of telephone 53 can make local and long distance calls.

Figure 3:
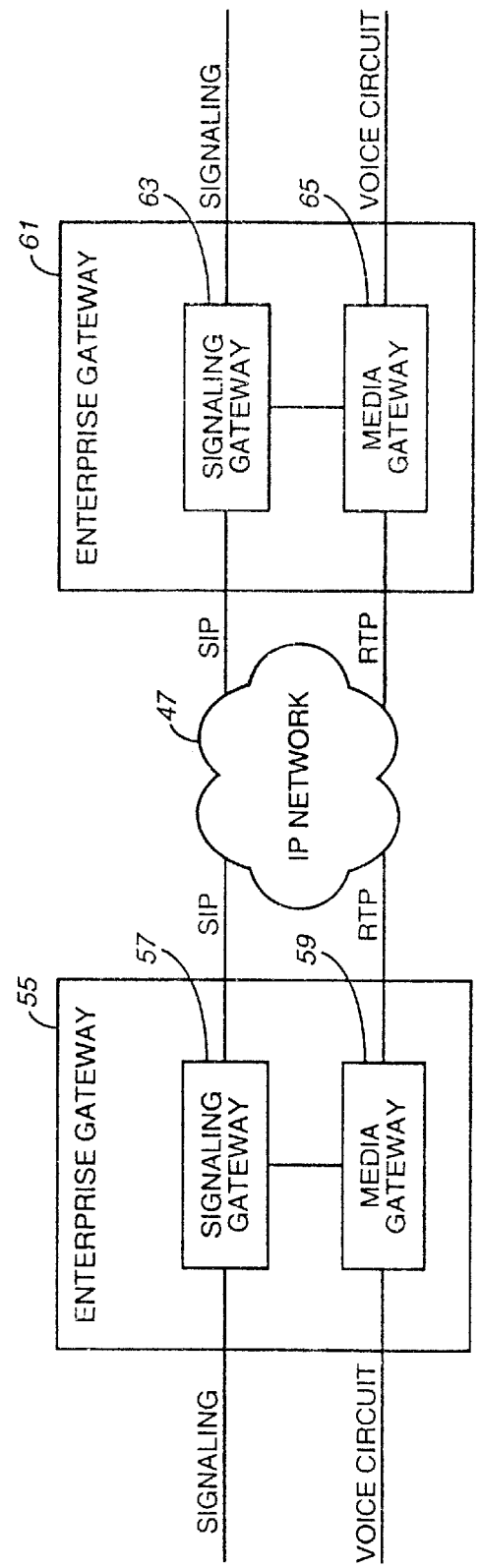
FIG. 3 is a block diagram illustrating the operation of enterprise gateways according to the present invention.

According to the present invention, a user can use telephone 53 and PBX 51 to make VPN calls. PBX 51 is operably connected to an ingress enterprise gateway (EG) 55. Although gateway 55 is labeled as an "ingress" EG, it is a bidirectional EG and the label "ingress" is only for identification relative to the call flow from telephone 53 to telephone 43. Referring to FIG. 3, EG 55 includes a signaling gateway 57 and a media gateway 59. Signaling gateway 57 provides bi-directional protocol translation from a telephony signaling protocol, such as SS7, ISDN, or channel associated signaling (CAS), depending upon the signaling protocol used by PBX 51, to an Internet telephony signaling protocol, such as session initiation protocol (SIP) or H.323. The preferred embodiment of the present invention is based upon the SIP signaling protocol. However, other embodiments are contemplated based on other protocol, such as H.323. Media gateway 59 provides bi-directional protocol translation between traditional telephony time division multiplexed voice circuits to an IP transport protocol such as real-time transport protocol (RTP). In the case of ISDN or SS7 signaling, signaling gateway 57 is connected to PBX 59 by a signaling link, which is either an SS7 signaling link or an ISDN D-channel. In the case of CAS signaling, signaling gateway 57 receives signaling information from media gateway 59.

SIP and RTP packets are transported across IP network 47 to an egress enterprise gateway EG 61. Although gateway 55 is labeled as an "ingress" EG, it is a bidirectional EG and the label "ingress" is only for identification relative to the call flow from telephone 53 to telephone 43. EG 61 includes a signaling gateway 63 and a media gateway 65. Signaling gateway 63 and media gateway 65 perform bidirectional protocol translations in the manner described with respect to signaling gateway 57 and media gateway 59, respectively. Referring again to FIG. 2, EG 61 is connected to switch 33 of PSTN 27 by DAL 23.

Referring again to FIG. 2, a VPN call can be placed from telephone 53, located for example in Malaysia, to a telephone 43, located for example in New York. A user takes telephone 53 off hook and dials a VPN number in the normal way. For example, the user dials 8-777-4321. PBX 51 sends a normal set up message with the dialed digits 777-4321 to EG 55. EG 55 performs a protocol translation and formulates a SIP invite message of the form:
INVITE:7774321@xyzus.com
FROM:5551234@xyzmalaysia.com
TO:7774321@xyzus.com
In the preferred embodiment, SIP URLs are of the form "telephone_number@gateway." Thus, EG 55 is identified as xyzmalaysia.com and EG 61 is identified at xyzus.com. The SIP invite message is transported across IP network 47 to EG 61. EG 61 performs a protocol translation and sends set up message for VPN number 777-4321 to switch 33 over DAL 23. Switch 33 recognizes the call as a VPN call and consults SCP 35 for routing instructions. SCP 35 uses the dialed digits, the OSID of switch 33, and the OTG of DAL 23 to provide routing instructions to switch 33. Based upon the instructions received from SCP 35, the call is set up across PSTN 37 to telephone 43 using normal telephony signaling. During call setup, egress enterprise gateway 61 passes IP telephony signaling through IP network 47 back to ingress enterprise gateway 55.

The system of the present invention also provides VPN services initiated from telephones 43 served by PSTN 37 to telephones 53 served by IP network 47. A user takes telephone 43 off hook and dials a VPN number, for example, the user dials 8-555-1234. PBX 51 sends a set up message with the dialed digits 555-1234 to switch 39 over DAL 45. Switch 39 recognizes the call as a VPN call and consults a SCP 63 for routing instructions. SCP 63 uses the dialed digits, the OSID of switch 39, and the OTG of DAL 45 to provide routing instructions to switch 39.

Based upon the instructions received from SCP 63, switch 39 sends an SS7 initial address message (IAM) to 33. Switch 33 sends a setup message to EG 61. EG 61 performs a protocol translation and formulates a SIP invite message of the form:
INVITE:5551234@xyzmalaysia.com
FROM:7774321@xyzus.com
TO:5551234@xyzmalaysia.com
The SIP invite message is transported across IP network 47 to egress enterprise gateway 55. EG 55 performs a protocol translation and sends set up message for VPN number 555-1234 to PBX 51.

From the foregoing, it may be seen that the present invention uses IP telephony to extend the architecture and infrastructure of virtual private networks to areas with unreliable access to the PSTN. A portion of the call is setup and transported across an IP network using a layer of intelligence that routes the call and its signaling to an appropriate enterprise gateway. A portion of the call is setup and transported across the PSTN using traditional VPN infrastructure. Additionally, the present invention may be used to provide virtual private network services to Internet devices and appliances, such as IP phones 65 and IP telephony enabled personal computers 67.

The present invention has been illustrated and described with respect to a presently preferred embodiment. Those skilled in the art will recognize alternative embodiments given the benefit of the foregoing disclosure. Accordingly, the foregoing disclosure is for purposes of illustration and not of limitation.

Thus, having fully described the present invention by way of example with reference to attached drawings figures, it will be readily appreciated that many changes and modifications may be made to the invention and to any of the exemplary embodiments shown and/or described herein without departing from the spirit or scope of the invention, which is defined in the appended claims.

What is claimed is:

1. An apparatus for providing virtual private network services, comprising:
    an enterprise gateway configured to translate between virtual private network internet telephony signal protocol signals and virtual private network telephony signaling protocol signals between virtual private network internet protocol transport signals and virtual private network telephony time division multiplexed signals;
    a direct access line operably connected to the enterprise gateway; and
    a switch of a public switched telephone network operably connected to the direct access line.

2. The apparatus of claim 1, wherein the enterprise gateway includes a packet switched network interface.

3. The apparatus of claim 1, wherein the enterprise gateway comprises:
    a signaling gateway; and
    a media gateway.

4. The apparatus of claim 3, wherein the signaling gateway comprises means for converting internet protocol call set-up messages to telephone call set-up messages.

5. The apparatus of claim 3, wherein the signaling gateway comprises means for converting internet session initiation protocol messages to telephone call set-up messages.

6. The apparatus of claim 1, comprising:
a second enterprise gateway operably connected to an internet protocol network; and,
an originating private branch exchange operably connected to the second enterprise gateway.

7. The apparatus of claim 6, wherein the second enterprise gateway comprises:
a signaling gateway; and
a media gateway.

8. The apparatus of claim 7, wherein the signaling gateway of the second enterprise gateway comprises means for converting telephone call set-up messages to internet protocol call set-up messages.

9. The apparatus of claim 7, wherein the signaling gateway of the second enterprise gateway comprises means for converting telephone call set-up messages to internet session initiation protocol messages.

10. The apparatus of claim 1, comprising:
a terminating private branch exchange operably connected to the public switched telephone network.

11. A virtual private network apparatus for providing virtual private network services between a public switched telephone network and an internet protocol network, comprising:
a signaling gateway configured to receive telephony signaling protocol signals, the telephony signaling protocol signals providing call signaling for a virtual private network call initiated by a caller, the signaling gateway being configured to convert the telephony signaling protocol signals to internet telephony signaling protocol signals, the signaling gateway being further configured to receive internet telephony signaling protocol signals and convert the received internet telephony signaling protocol signals to telephony signaling protocol signals; and
a media gateway coupled to the signaling gateway, the media gateway configured to translate between telephony time division multiplexed signals and internet protocol transport signals.

12. The apparatus of claim 11, wherein the telephony signaling protocol signals are signaling system 7 signals.

13. The apparatus of claim 11, wherein the telephony signaling protocol signals are ISDN signals.

14. The apparatus of claim 11, wherein the telephony signaling protocol signals are channel associated signaling signals.

15. The apparatus of claim 11, wherein the internet telephony signaling protocol signals are session initiation protocol signals.

16. The apparatus of claim 11, wherein the internet telephony signaling protocol signals are H.323 signals.

17. The apparatus of claim 11, wherein the internet protocol transport signals are real-time transport protocol signals.

18. The apparatus of claim 11, wherein the signaling gateway comprises means for converting internet protocol call set-up messages to telephone call set-up messages.

19. The apparatus of claim 11, wherein the signaling gateway comprises means for converting internet session initiation protocol messages to telephone call set-up messages.

20. The apparatus of claim 11, wherein the signaling gateway is also configured to convert telephone call set-up messages to internet protocol call set-up messages.

21. The apparatus of claim 11, wherein the signaling gateway is also configured to convert telephone call set-up messages to internet session initiation protocol messages.

22. A virtual private network apparatus for providing virtual private network services between a public switched telephone network and an internet protocol (IP) network, comprising:
a signaling gateway configured to receive internet telephony signal protocol signals, the internet telephony signal protocol signals providing call signaling for a virtual private network call initiated by a caller, the signaling gateway being configured to convert the internet telephony signal protocol signals to telephony signaling protocol signals; and
a media gateway coupled to the signaling gateway, the media gateway being configured to translate between internet protocol transport signals and telephony time division multiplexed signals.

23. The apparatus of claim 22, wherein the telephony signaling protocol signals are signaling system 7 signals.

24. The apparatus of claim 22, wherein the telephony signaling protocol signals are ISDN signals.

25. The apparatus of claim 22, wherein the telephony signaling protocol signals are channel associated signaling signals.

26. The apparatus of claim 22, wherein the internet telephony signaling protocol signals are session initiation protocol signals.

27. The apparatus of claim 22, wherein the internet telephony signaling protocol signals are H.323 signals.

28. The apparatus of claim 22, wherein the internet protocol transport signals are real-time transport protocol signals.

29. The apparatus of claim 22, wherein the signaling gateway comprises means for converting internet protocol call set-up messages to telephone call set-up messages.

30. The apparatus of claim 22, wherein the signaling gateway comprises means for converting internet session initiation protocol messages to telephone call set-up messages.

31. The apparatus of claim 22, wherein the signaling gateway is also configured to convert telephone call set-up messages to internet protocol call set-up messages.

32. The apparatus of claim 22, wherein the signaling gateway is also configured to convert telephone call set-up messages to internet session initiation protocol messages.

33. A method for providing virtual private network (VPN) services in a virtual private network that includes a public switched telephone network (PSTN) and an Internet Protocol (IP) network, the method comprising:
receiving a first call setup message from a first device for establishing a VPN call to a second device, the first call setup message including a VPN number;
translating the first call setup message to an IP protocol message, the IP protocol message including the VPN number;
transmitting the IP protocol message across the IP network;
translating the IP protocol message to a second call setup message, the second call setup message including the VPN number; and
establishing the VPN call with the second device through the PSTN using the second call setup message.

34. The method of claim 33, wherein the first call setup message is received from a private branch exchange.

35. The method of claim 33, wherein the IP protocol message includes a session initiation protocol (SIP) invite message.

36. The method of claim 33, wherein the establishing the VPN call includes:
transmitting the second call setup message to a switch associated with the PSTN via a direct access line.

37. The method of claim 36, wherein the establishing the VPN call further includes:

obtaining routing instructions based on the VPN number, an identifier associated with the switch, and an identifier of the direct access line.

38. A method for providing virtual private network (VPN) services in a virtual private network that includes a public switched telephone network (PSTN) and an Internet Protocol (IP) network, the method comprising:

receiving a first call setup message from a first device for establishing a VPN call to a second device, the first call setup message being received from the PSTN and icluding a VPN number;

translating the first call setup message to an IP protocol message, the IP protocol message including the VPN number;

transmitting the IP protocol message across the IP network;

translating the IP protocol message to a second call setup message, the second call setup message including the VPN number; and establishing the VPN call with the second device using the second call setup message.

39. The method of claim 38 wherein the first call setup message is received from a switch associated with the PSTN via a direct access line.

40. The method of claim 38 wherein the IP protocol message includes a session initiation protocol (SIP) invite message.

41. The method of claim 38 wherein the establishing the VPN call includes:

transmitting the second call setup message to a private branch exchange associated with the second device.

* * * * *